F. L. KILLIAN.
MACHINE FOR PREPARING CORES FOR REUSE IN MANUFACTURING PNEUMATIC TIRE SHOES.
APPLICATION FILED AUG. 21, 1911. RENEWED APR. 15, 1912.
1,053,404.
Patented Feb. 18, 1913.
3 SHEETS—SHEET 1.
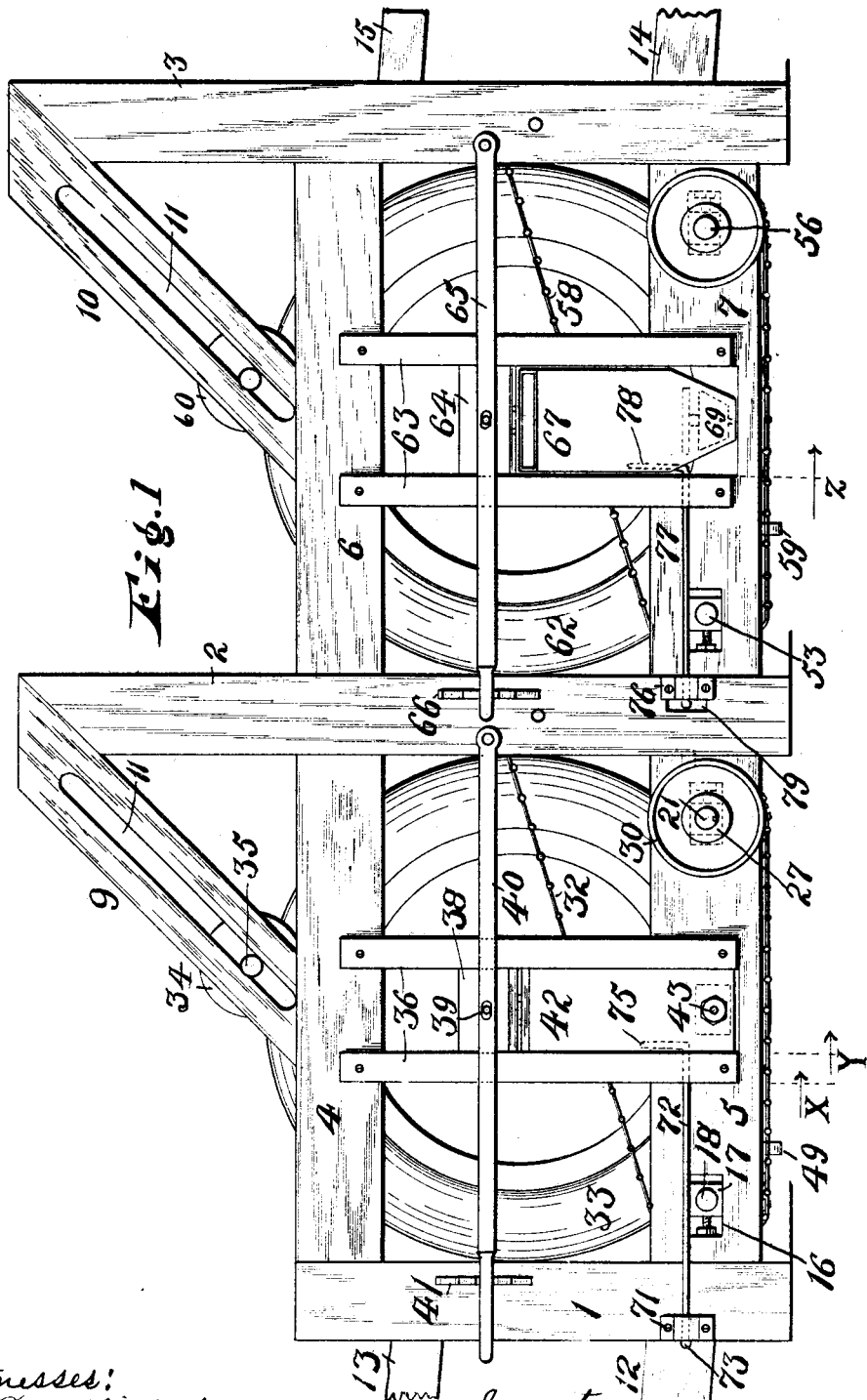

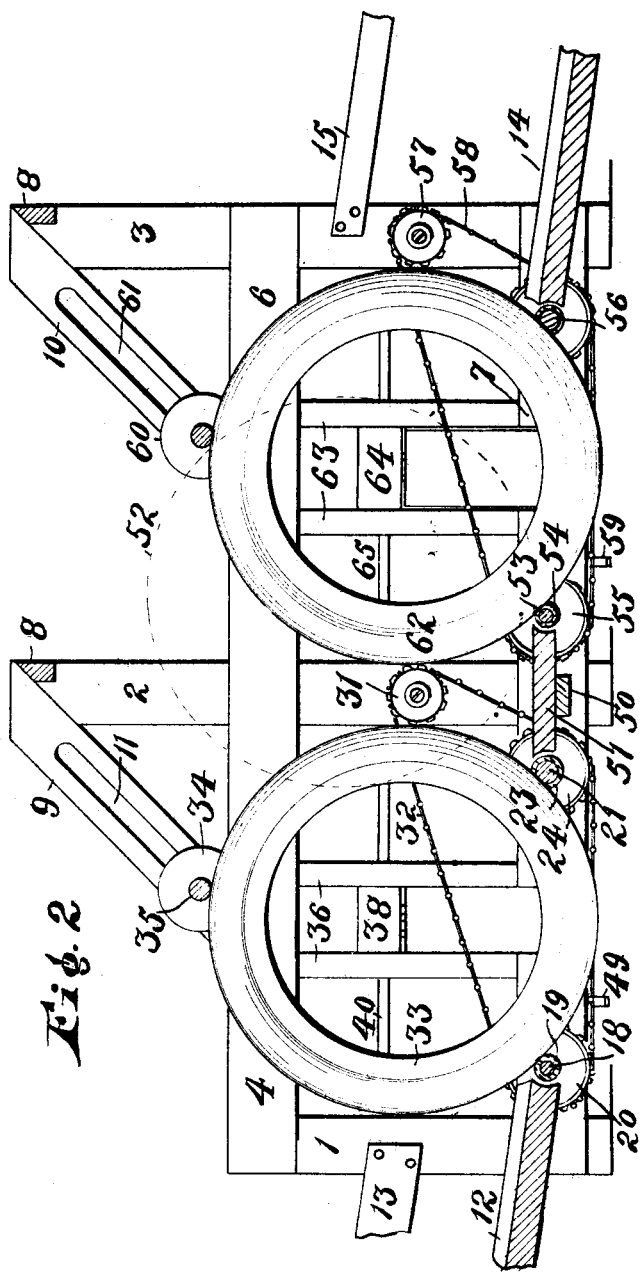

F. L. KILLIAN.
MACHINE FOR PREPARING CORES FOR REUSE IN MANUFACTURING PNEUMATIC TIRE SHOES.
APPLICATION FILED AUG. 21, 1911. RENEWED APR. 15, 1912.
1,053,404.
Patented Feb. 18, 1913.
3 SHEETS—SHEET 3.
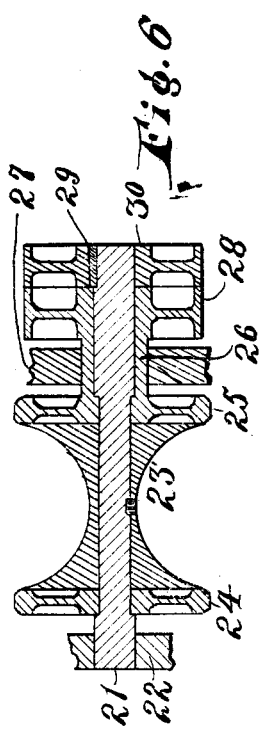
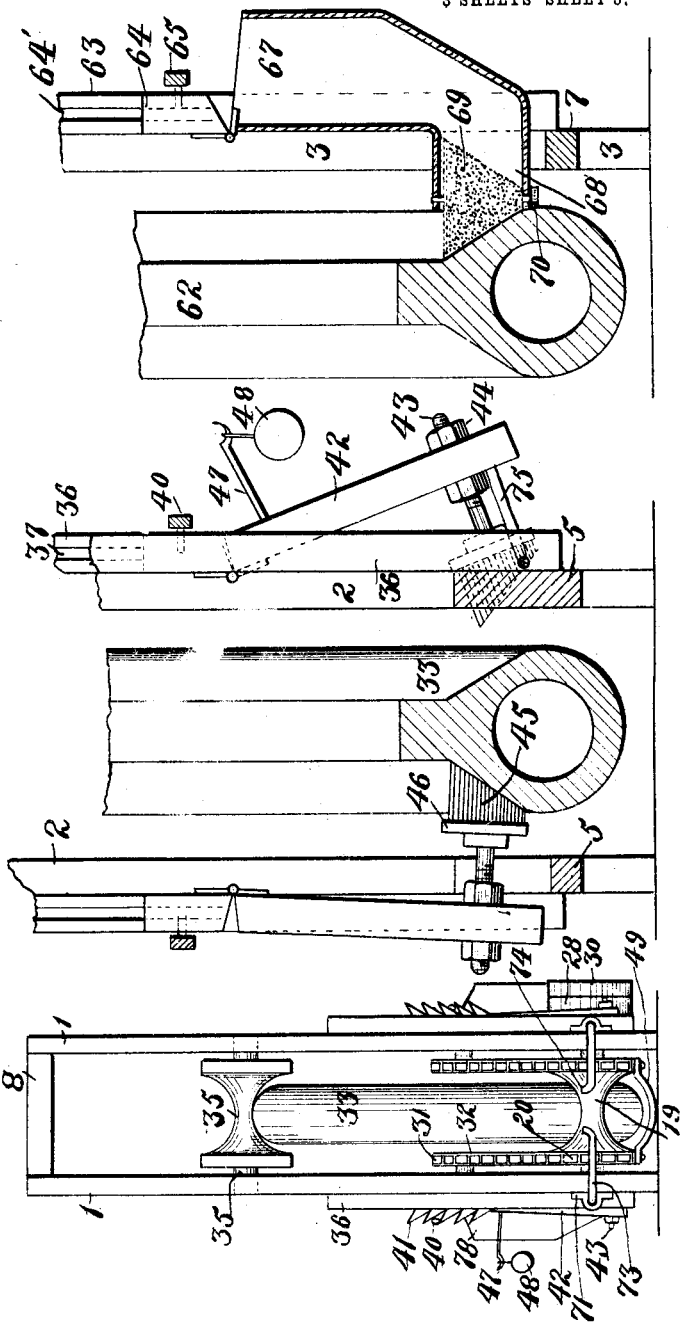
Witnesses:
J. L. McClintock
Mae Grable
Inventor,
Frederick Leo Killian,
by
C. E. Humphrey
Atty.

UNITED STATES PATENT OFFICE.

FREDERICK L. KILLIAN, OF AKRON, OHIO, ASSIGNOR OF ONE-HALF TO FRED R. ORMSBY, OF AKRON, OHIO.

MACHINE FOR PREPARING CORES FOR REUSE IN MANUFACTURING PNEUMATIC-TIRE SHOES.

1,053,404.

Specification of Letters Patent.

Patented Feb. 18, 1913.

Application filed August 21, 1911, Serial No. 645,215. Renewed April 15, 1912. Serial No. 691,072.

*To all whom it may concern:*

Be it known that I, FREDERICK LEO KILLIAN, a citizen of the United States, residing at Akron, in the county of Summit and State of Ohio, have invented new and useful Improvements in Machines for Preparing Cores for Reuse in Manufacturing Pneumatic-Tire Shoes, of which the following is a specification.

This invention relates to machines for preparing cores for reuse in manufacturing pneumatic tire-shoes.

Cores for the manufacture of tire-shoes are annularly-formed and are either made integral or are formed of a plurality of segment-shaped members adapted to be assembled together with their ends abutting to form the core. The present practice in the use of cores is to coat portions of the faces of the core with a siccative solution of rubber cement which is allowed to dry before the tire-shoe is built up and after vulcanization the tire-shoes are stripped from the core and the core would then seem to be ready for reuse, but experience shows that so much of the rubber cement, used to increase the adhesion of the fabric of the tire-shoe to the core during the building of the shoe, hardens or dries and remains on the core that it must be scraped from the core and a new layer of a siccative solution of rubber cement applied to the core before it is ready for reuse in the building of a tire-shoe. It has been customary to scrape this hardened and dry cement from the core and then apply the new layer of rubber cement by hand. In large factories where thousands of cores are daily used repeatedly, the scraping of the hardened and dry cement from the cores requires the services of a large corps of men and the applying of the rubber cement is usually done by the tire-building workmen previous to the building up of the next tire, and where the number of tire-building workmen in the factory runs into hundreds, and each supplied with a cement receptacle for coating the cores to be used there is a vast amount of waste of the rubber cement which is a comparatively expensive article, and rapidly dries due to the vehicle employed which is usually bisulfid of carbon or benzin, it being apparent that as the number of receptacles containing the rubber cement is increased by furnishing one to each builder, the amount of evaporation and waste of the rubber cement materially increases. The cores are exceedingly clumsy and very heavy, running in most cases from one hundred fifty to four hundred pounds each and their handling requires the services of a number of men, who, after cleaning, place them in a rack, to economize space, and from which they must be moved to the places where they are to be recoated and employed.

Numerous other objections exist to the present method of preparing the cores for reuse in manufacturing pneumatic tire-shoes, and hence, the object of this invention is to provide a machine which will not only remove the hardened and dry cement from the cores but will recoat them with a siccative solution of rubber cement and deliver them ready for reuse much more rapidly than can be done by a large force of skilled men, the invention contemplating the provision of suitable mechanism for removing the hardened and dry cement from the used cores and recoating the same after the cleaning operation, irrespective of whether the core is provided with a hub and extension spokes for holding the core or not. In reference to this last, it may be stated that, cores for this class of work are usually not provided with a hub and spokes and hence, cannot be mounted for cleaning on a revoluble shaft without the employment of a temporary hub and extensible spokes which must be suitably positioned before the core can be handled, all of which requires time and an excessive amount of labor.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claims hereunto appended.

In the drawings in which similar reference numerals indicate like parts in the different figures, Figure 1, is a view in side elevation of my improved device; Fig. 2, is a vertical central longitudinal sectional view of the same; Fig. 3, is a view in end elevation looking from the left in Fig. 1; Fig. 4, is a sectional view, a portion being approximately on line X of Fig. 1 and a portion on line Y thereof; Fig. 5, is a vertical sectional view of a portion of the mechanism approximately on line Z of Fig. 1; and Fig. 6, is a central view of a detail of the mechanism employed shown in section.

My improvement embodies a frame consisting preferably of three pairs of posts, 1, 2 and 3, the members of each pair being in transverse alinement and spaced laterally from each other and extending between the pairs 1 and 2 are upper side arms 4 and lower side arms 5, and between the pair of posts 2 and 3 are upper side arms 6 and lower side arms 7.

The members of pairs designated by the reference numerals 2 and 3 are preferably united near the tops by cross arms 8 to hold them in spaced relation with respect to each other. Extending from the upper faces of the upper pair of side arms 4 to the tops of the posts 2 are parallel inclined arms 9 and from the upper faces of the upper side arms 6 to the upper ends of the posts 3 are inclined arms 10. These arms 9 and 10 are provided with longitudinal grooves or slots 11 and 61, respectively, constituting ways for a purpose to be later described. Connected with the left end of the frame, in Fig. 1, is a feed-chute 12 above which are a pair of spaced guiding rails 13, and extending from the right end of the frame, in Fig. 1, is a centrally arranged discharge-chute 14, above which are a pair of spaced guiding rails 15.

Mounted in oppositely disposed slots 16, in the lower side arms 5 of the frame, are adjustable journal boxes 17 for a transverse shaft 18. Loosely mounted on the shaft 18, and centrally thereof, is a roller 19 having a concave periphery. At the ends of the roller 19 and fixedly mounted on the shaft 18 are a pair of sprocket-wheels 20. At a point remote from the shaft 18 is a second transverse shaft 21 extending between the sides of the frame and having one end thereof adjustably mounted in a box 22, see Fig. 6. This shaft has a reduced median portion on which fixedly mounted is a roller 23 having a periphery similar to the roller 19. Loosely mounted at one end of the roller 23 is a sprocket-wheel 24 and at the opposite end a sprocket-wheel 25 similarly mounted. The hub of the sprocket-wheel 25 is provided with a laterally-extending sleeve 26 adapted to be mounted in an adjustable box 27 arranged to be shifted in unison with the box 22 when desired. Secured on the end of the sleeve 26, or formed integrally therewith, is a pulley 28 adapted to revolve in unison with the sprocket-wheel 25. Fastened by a key 29 or otherwise on the shaft 21 is a pulley 30. Secured to each of the inner faces of each of the posts 2 is a sprocket-wheel 31, on which is a sprocket-chain 32, on each side of the device, and which extends around the sprocket-wheels 24 25 and 20, so that they will all revolve in unison. Mounted on the peripheries of the rollers 19 and 23 is a ring core 33 of ordinary construction which is held against lateral movement by means of an idler roller 34, having a periphery similar to the rollers 19 and 23 and with the ends of its shaft 35 thereof projecting laterally, to slide in the slots 11 which constitute guiding means therefor. The core 33 is shifted to the position which it occupies in Figs. 1 and 2 by rolling it over the feed-chute 12 during which time it is guided by the guiding rails 13 until it seats upon the peripheries of the three rollers, 19, 23 and 34 which form a tripodal structure for sustaining the core during the removing of the hard and dried cement from the surfaces thereof. The core is revolved while thus seated by communicating motion to the pulley 30, by a belt or otherwise, which revolves the shaft 21 and roller 23 causing a simultaneous revolution of the core 33. During the revolution of the core the hardened and dried cement adhering to the surface of the core is removed by mechanism now to be described, and as the mechanism for doing this is similar on opposite sides of the core the description will be confined to one mechanism attention being directed to Figs. 1 and 4. Extending vertically between the lower side arm 5 and the upper side arm 4 is a pair of parallel bars 36 the inner opposing faces of which are provided with longitudinal grooves 37 to constitute ways. Slidably mounted in the ways is a carrier 38 having projecting from its outer face a pin 39 adapted to engage in a slot in a shifting-lever 40 one end of which is pivotally fulcrumed on the post 2 and its opposite end adapted to be held in an adjusted position through the medium of a rack 41. Pivotally secured to the lower end of the carrier 38 is a depending arm 42 capable of being swung toward and away from the core between the bars 36.

The mechanism for removing the hardened and dried cement from the surface of the core 33 may consist of various devices, a preferred form of which, however, embodies a bolt 43 adjustably mounted in the lower end of the arm 42 and held in position by a clamping nut 44. On the inner end of the bolt 42 is a scraping tool preferably consisting of a plurality of flexible strips 45 of material such as, spring steel, or the like, mounted in a head 46 on the end of the bolt. These scraping blades 45 will preferably be so shaped and fashioned that they will engage only that portion of the surface of the core on which the siccative rubber cement has been applied and it will, of course, be obvious that if the rubber cement is applied to other portions of the outer surface of the core-body the general formation of the scraping-blade will be altered accordingly so as to reach and engage all portions on which there is any liability of any hardened and dried cement remaining on the core. In order to cause the scraping-blades 45 to engage the surface of the core with sufficient pressure to clean the same I employ some means for forcing them inwardly toward the core, and for this purpose I show an arm 47 projecting from the outer face of the arm 42 to which is attached a weight 48 sufficient to give the required pressure of the blades 45. However, if desired, a resilient element such as a spring may be employed for this purpose.

After the scraping operation the core 33 is removed from its seat on the rollers 19 and 23 by the following mechanism: Secured to, extending transversely of, and moving with the sprocket-chains 32 is a bar 49. Extending between the posts 2 is a cross-bar 50 on which is centrally mounted a bridge 51. The bar 49 is adapted to engage the core 33 as the sprocket-chains 32 move and raise the core from its seat, causing it to roll over the bridge 51 as indicated by a dotted circle 52 in Fig. 2. During the cleaning operation the sprocket-chains 32 are preferably inoperative and the roller 23 is revolved through the median of a belt applied to the pulley 30, but when it is desired to shift the core, the belt is shifted so as to partially or wholly engage the pulley 25 which revolves the sprocket-wheel 25 and one sprocket-chain 32, causing a simultaneous revolution of both sprocket-wheels 20 and a corresponding movement of the opposite sprocket-chain on the opposite side of the core. As these chains move the cross-bar 49, the latter engages the outer or tread surface of the core and raises it upwardly and forwardly simultaneously on the roller 23 as a pivot, and shifts or rolls it over the bridge 51. After the core has been removed the belt is shifted back onto the pulley 30 and the tripodal structure consisting of the rollers 19, 23 and 34 is ready to receive another core. When the core 33 is raised from its seat on rollers 19 and 23 the roller 34 running on the upper face of said core will be raised sufficiently to permit the core to move forward, in doing which, the ends of the shaft 35 of the roller 34 will slide upwardly in the slots 11.

Extending between the side arms 7 and mounted adjustably therein is a shaft 53 bearing a loosely mounted roller 54 and at the ends of the roller a pair of fixedly mounted sprocket-wheels 55. This roller and the sprocket-wheels are exactly similar to the roller 19 and sprocket-wheels 20.
Also extending between the side arms 7 of the frame is a shaft 56 bearing identically the same mechanism as is shown in Fig. 6, embodying a roller fixedly mounted on the shaft and having at the ends thereof loose sprocket-wheels, and a tight and loose pulley, the latter connected with one of the sprocket-wheels but as the structure is the same as that described in the mechanism mounted on the shaft 21 a further description is believed to be unnecessary.

Mounted on the inner face of each of the posts 3 are sprocket-wheels 57 to receive sprocket-chains 58 whose function is the same as the function of the sprocket-chains 32 and these sprocket-chains are also provided with a cross-bar 59 identical in construction with the cross-bar 49. When the core 32 has been shifted by means of the cross-bar 49 over the bridge 51 it seats upon the roller 54 and the roller carried by the shaft 56 and is held in position by a roller 60 the ends of the shaft of which are slidably mounted in slots 61 in the inclined arm 10. The construction and operation of this portion of the device is precisely the same as that of the first mechanism described and the core 62 is rotated in precisely the same manner and is removed from its seat on the roller 54 and the roller carried by the shaft 56 into the discharge-chute 14 by means of the transverse bar 59 operated by means of the sprocket-chains 58 and in passing over the chute 14 the core is held in an upright position by means of the guiding rails 15.

The adhesive rubber cement is applied to portions of the surface of the core by the following mechanism which is similar on both sides of the device, and hence, a description of one is deemed to be sufficient. Extending between the lower side arm 7 and the upper side arm 6 are a pair of parallel bars 63 spaced from each other and provided with grooves 64 in their inner opposing faces to constitute ways to permit the vertical shifting of a carrier 64 mounted therein. This carrier is raised by means of a lever 65 fulcrumed on the post 3 and held in a desired position by seating the loose end thereof in one of the teeth of the rack 66 on the posts 2. Pivotally secured to the carrier 64 is a tank 67, adapted to contain a liquid rubber cement, the lower end of which is provided with a discharge spout 68 which turns inwardly toward the core. Mounted in the opening in the end of the tank 67 is a revoluble brush 69, which serves to normally close the opening in the spout 68 and to convey a suitable quantity of liquid cement therefrom and apply it to the proper portions of the core. The brush 69 is rotated when in use by means of a roller 70, mounted on the shaft of the brush, which frictionally engages a portion of the surface of the core so that, when the core is revolved the brush is also simultaneously revolved to supply the coating of cement. After the cement has been applied, which operation usually requires only one complete revolution of the core the belt, which operates the shaft 56, is shifted onto the pulley which is attached to the sprocket-wheel on the shaft 56, causing thereby a simultaneous movement of the sprocket-chains 58, which carry the bar 59 around into position to engage and shift the core 62 from its seat, and roll it onto the discharge-chute 14.

Experience has shown that as the scraping-blades 45 and brushes 69 engage, what may be termed the inner incline lateral faces of the core, it has been found desirable to swing the blades and brushes laterally away from the core, during the removal of the same either from the position which they occupy between the rollers 19 and 23, or between the roller 54 and the roller on the shaft 56. In order to accomplish this the following mechanism is employed: Secured to the outer face of each of the posts 1 are the journal bearings 71, in which are mounted longitudinally-extending rotatable shafts 72 the opposite ends of which are suitably mounted, say, for instance, in one of the bars 36. The front ends, that is to say, the left ends in Figs. 1 and 2, of these shafts are provided with laterally bent portions 73 terminating in tappet ends 74 which lie in the path of the cross-bar 49, and are rocked upwardly by it as it moves forward toward the core in unison with the sprocket-chains 32. The opposite ends of the shafts 72 are provided with abruptly-bent portions 75 which when the shafts 72 are rotated engage the inner faces of the arms 42 and swing them outwardly, as shown in the portion on the right of Fig. 4, to thereby permit the ready bodily shifting of the core, the operation of swinging these arms 42, simultaneously and laterally, taking place immediately before the engagement of the transverse bar 49 with the core, so that by the time the latter is shifted by the bar 49, the arms 42 with their accompanying mechanism will have been swung out of the way to leave a clear passage for the core. I preferably employ identical mechanism for shifting the tanks 57 laterally, to move the brushes 69 from contact with the core 62 before it is to be shifted, and this mechanism embodies a journal bearing 76 on the outward face of each of the posts 2 in which are mounted longitudinal shafts 77, with their right ends having abruptly-bent portions 78 which engage the inner faces of the tanks 67 in the same manner as has been described with reference to the engagement of the ends 75 with the arms 42. The opposite ends of the shafts 77 are bent laterally and extend through slots 79 in the posts 2, to engage the cross-bar 59 on the sprocket-chains 58 in a precisely similar manner as has been described with reference to the function of the cross-bar 49.

From the foregoing description it will be seen that as the cores are removed from the vulcanizing molds, having hardened and caked cement on their lateral faces, they will be fed down the chute 12 into the mechanism just described by which they are cleaned and the hardened and caked rubber cement removed, after which they are shifted over the bridge 51, into the mechanism which places a new coat of rubber cement on the proper places on the surface of the core; and after placement of this layer of cement they are lifted and discharged from the device through the discharge-chute 14 and are then ready for reuse, the whole operation occupying but a very short interval of time and requiring comparatively little or no labor thereby reducing the expense and time required to prepare the cores for reuse.

If different sizes of cores are used in connection with this device, the positions of the scraping-blades 45 and the cement-applying brush 69 may be shifted to proper elevations to perform their functions by means of the levers 40 and 65, respectively.

It may be stated that if it is desired, the sprocket-chains 32 and 38 may be operated simultaneously with the revolution of the rollers which support the cores, so as to eject the latter after making a complete operation. This can be easily done by making the sprocket-wheels at the ends of the rollers rigid with the shafts on which they are mounted or securing the pulleys 28 and 30 together or by running the belt on both pulleys constantly so that the chains which remove the cores are run during the cleaning and cement-applying operations. Or as described, the cleaning and cement operations may be followed by the movement of the sprocket-chains 32 and 38 to eject the core, as before stated, but as this use of the machine is obvious a further description and illustration thereof is believed to be unnecessary.

I claim:

1. A machine for preparing cores for reuse in manufacturing pneumatic tire-shoes comprising means for revolving a used core, said means embodying three rollers tripodally arranged, means for revolving one of said rollers causing a simultaneous revolution of said core, a sprocket-chain mounted on each side of the position occupied by said core, means for moving said sprocket-chains, a member connecting said sprocket-chains and extending across the space occupied by said core and arranged to shift said core from said tripodal structure, and means for cleaning the surface of said core during its revolution.

2. A machine for preparing cores for reuse in manufacturing pneumatic tire-shoes comprising means for revolving a used core, said means embodying three rollers tripodally positioned, means for revolving one of said rollers to cause the revolution of said core, and a pair of cleaning tools each of which is adapted to engage one of the side faces of said core during its revolution, and mechanism for shifting the position of the same.

3. A machine for preparing cores for reuse in manufacturing pneumatic tire-shoes comprising means for revolving the used core, said means embodying three rollers tripodally arranged, means for revolving one of said rollers to cause the continuous revolution of said core, cleaning tools engaging the surface of said core for removing the accumulation thereon during its revolution, and mechanism for shifting the position of said core after the cleaning operation.

4. A machine for preparing cores for reuse in manufacturing pneumatic tire-shoes comprising a plurality of rotatable rollers suitably positioned to support a core, means for revolving one of said rollers to thereby cause the revolution of said core, means for cleaning the used surface of said core during its revolution, feed mechanism for moving said core into position engaged by said rollers, and mechanism for shifting the position of said core after the cleaning operation.

5. A machine for preparing cores for reuse in manufacturing pneumatic tire shoes comprising a supporting frame, a plurality of rollers suitably positioned to revolubly support a used core, means for feeding cores into position to be supported by said rollers, means for revolving said core, and means for cleaning the used surface thereof.

6. A machine for preparing cores for reuse in manufacturing pneumatic tire shoes comprising a supporting frame, a plurality of rollers suitably positioned to revolubly support a used core, means for feeding cores into position to be supported by said rollers, means for revolving said core, means for cleaning the used surface of said core, and mechanism for removing the core from the rollers after the cleaning operation.

In testimony whereof I have hereunto set my hand in presence of two subscribing witnesses.

FREDERICK L. KILLIAN.

Witnesses:
C. E. HUMPHREY,
A. L. McCLINTOCK.